United States Patent
Ravindranath

(10) Patent No.: US 7,774,483 B1
(45) Date of Patent: Aug. 10, 2010

(54) SUPPORTING A COMMUNITY OF SUBSCRIBERS IN AN ENVIRONMENT USING A SERVICE SELECTION GATEWAY (SSG)

(75) Inventor: Vinodh Kumar Ravindranath, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 928 days.

(21) Appl. No.: 10/189,519

(22) Filed: Jul. 8, 2002

(51) Int. Cl.
- *G06F 15/16* (2006.01)
- *G06F 15/173* (2006.01)
- *G06F 12/00* (2006.01)

(52) U.S. Cl. .......................... 709/229; 709/225; 726/6; 726/12; 726/13; 726/18

(58) Field of Classification Search .............. 709/220, 709/223–226, 203, 244, 245, 229; 726/6, 726/7, 11–13, 18, 28, 30
See application file for complete search history.

(56) References Cited

U.S. PATENT DOCUMENTS

| | | | |
|---|---|---|---|
| 5,210,869 A | 5/1993 | Williams | |
| 5,261,052 A | 11/1993 | Shimamoto et al. | |
| 5,493,614 A | 2/1996 | Chaum | |
| 5,518,122 A | 5/1996 | Tilles et al. | |
| 5,673,393 A * | 9/1997 | Marshall et al. | 709/226 |
| 5,826,243 A * | 10/1998 | Musmanno et al. | 705/35 |
| 5,878,230 A | 3/1999 | Weber et al. | |
| 5,951,637 A * | 9/1999 | Kuzma | 709/204 |
| 5,953,710 A * | 9/1999 | Fleming | 705/38 |
| 5,983,261 A * | 11/1999 | Riddle | 709/204 |
| 5,996,011 A * | 11/1999 | Humes | 709/225 |
| 6,131,120 A * | 10/2000 | Reid | 709/225 |
| 6,151,316 A | 11/2000 | Crayford et al. | |

(Continued)

OTHER PUBLICATIONS

Entitled:"Data Sheet: Cisco Service Selection Gateway". Published on: Oct. 7 21:07:17 PDT 2001; Available at: http://www.cisco.com/warp/public/cc/pd/as/6400/prodlit/ssgw_ds.htm ( pp. 3).

(Continued)

*Primary Examiner*—Salad Abdullahi
*Assistant Examiner*—Gregory G Todd
(74) *Attorney, Agent, or Firm*—Patent Capital Group

(57) ABSTRACT

A service policy manager may be used to enable a first subscriber in a community to administer rules on another subscriber in the same community. A service selection gateway (SSG) may then be configured according to the rules to provides services according to the rules. As a result, the services provided to a subscriber depend not just on the individual profile of the subscriber, but also potentially on the rules administered by other members of the communities the subscriber is a part of.

21 Claims, 7 Drawing Sheets

U.S. PATENT DOCUMENTS

| | | | |
|---|---|---|---|
| 6,233,618 B1* | 5/2001 | Shannon | 709/229 |
| 6,405,243 B1 | 6/2002 | Nielsen | |
| 6,427,174 B1 | 7/2002 | Sitaraman et al. | |
| 6,438,583 B1 | 8/2002 | McDowell et al. | |
| 6,510,458 B1* | 1/2003 | Berstis et al. | 709/219 |
| 6,564,264 B1 | 5/2003 | Creswell et al. | |
| 6,745,367 B1 | 6/2004 | Bates et al. | 715/205 |
| 6,785,728 B1* | 8/2004 | Schneider et al. | 709/229 |
| 6,934,292 B1* | 8/2005 | Ammitzboell | 370/400 |
| 6,954,429 B2* | 10/2005 | Horton et al. | 370/230.1 |
| 6,993,026 B1* | 1/2006 | Baum et al. | 370/392 |
| 7,013,342 B2* | 3/2006 | Riddle | 709/230 |
| 7,281,038 B1* | 10/2007 | Salkewicz | 709/223 |
| 7,316,029 B1* | 1/2008 | Parker et al. | 726/13 |
| 7,450,507 B2* | 11/2008 | Tundlam et al. | 370/232 |
| 7,571,466 B2* | 8/2009 | Mitchell et al. | 726/4 |
| 7,650,420 B2* | 1/2010 | Chong et al. | 709/229 |
| 2002/0049806 A1* | 4/2002 | Gatz et al. | 709/203 |
| 2002/0057298 A1* | 5/2002 | Wassom et al. | 345/825 |
| 2002/0122422 A1* | 9/2002 | Kenney et al. | 370/392 |
| 2003/0014659 A1* | 1/2003 | Zhu | 713/200 |
| 2003/0055962 A1* | 3/2003 | Freund et al. | 709/225 |
| 2005/0130112 A1* | 6/2005 | Lotvin et al. | 434/323 |

OTHER PUBLICATIONS

Entitled:"Cisco Subscriber Edge Services Manager"; Published on: Dec. 14 14:18:38 PST 2001; Available at: http://www.cisco.com/warp/public/cc/pd/as/6400/prodlit/esvmn_ov.htm (pp. 9).

Entitled:"Node Route Processor—Service Selection Gateway Enhancements II"; Published on: Mar. 26 14:56:36 PST 2000; Available at: http://www.cisco.com/univercd/cc/td/doc/product/software/ios122/122newft/122limit/122b/122b_4/12 2b4_sg (pp. 17).

Entitled:"Service Selection Gateway"; Published on: Feb. 25 21:23:17 PST 2002;Available at: http://www.cisco.com/univercd/cc/td/doc/product/dsl_prod/6400/feat_gd/12_2_2/fg2_ssg.htm (pp. 82).

Rigney, et. al.; Entitled, "Request for Comments: 2865- Remote Authentication Dial In User Service (RADIUS)"; Jun. 2000; Available from www.ietf.org (76 Pages).

* cited by examiner

SUPPORTING A COMMUNITY OF SUBSCRIBERS IN AN ENVIRONMENT USING A SERVICE SELECTION GATEWAY (SSG)

RELATED APPLICATION

The present application is related to the co-pending U.S. patent application Ser. No. 10/086,346; Filed: Mar. 4, 2002, Entitled, "Service Selection Gateway (SSG) Allowing Access to Services Operating Using Changing Set of Access Addresses", assigned to common assignee, which is incorporated in its entirety herewith.

BACKGROUND OF THE INVENTION

1. Field of the Invention

The present invention relates to telecommunication networks, and more specifically to a method and apparatus for supporting a community of subscribers in an environment using a service selection gateway (SSG).

2. Related Art

Service selection gateways (SSG) generally refer to network switches/routers which allow a subscriber to selectively access various services on the Internet. In one common environment, a service provider (e.g., an interne service provider or a shop providing the subscriber terminals to access the services) controls the services a subscriber is permitted to access, and charges (receive compensation) the subscriber for accessing/using the services.

Communities generally refer to a group of subscribers having some type of relationships. Relationships can be well known ones such as father, siblings, from the same school/town, etc., or having any other type of relationship. It may be desirable to provide features of interest to communities using the SSG.

BRIEF DESCRIPTION OF THE DRAWINGS

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

A service selection gateway implemented according to an aspect of the present invention allows one subscriber of a community to cause rules to be administered (made effective) on another subscriber of the community instance. The access policies (in processing packets) affecting the service offering(s) for the another subscriber depend on the various rules administered on the another subscriber. At least for some type of communities (e.g., parent/child relationship, employer/employee relationship) such an ability to permit one person of a community to control the services offered to another person, may be desirable.

Accordingly, a service provider may conveniently specify the possible rules for each relationship type, and the subscribers permitted to administer the rules for other subscribers may be provided a convenient interface to easily administer the specific rules to administer. For example, a community type may be a family in which a community instance contains one subscriber who is a parent and the remaining two subscribers are siblings.

A rule associated with the family community type may permit a parent to specify the services the siblings are (not) permitted to access, and another rule may specify the amount of bandwidth each sibling is permitted to use. Accordingly, the parent may administer such rules on the two children to control the specific services the siblings are offered/provided.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
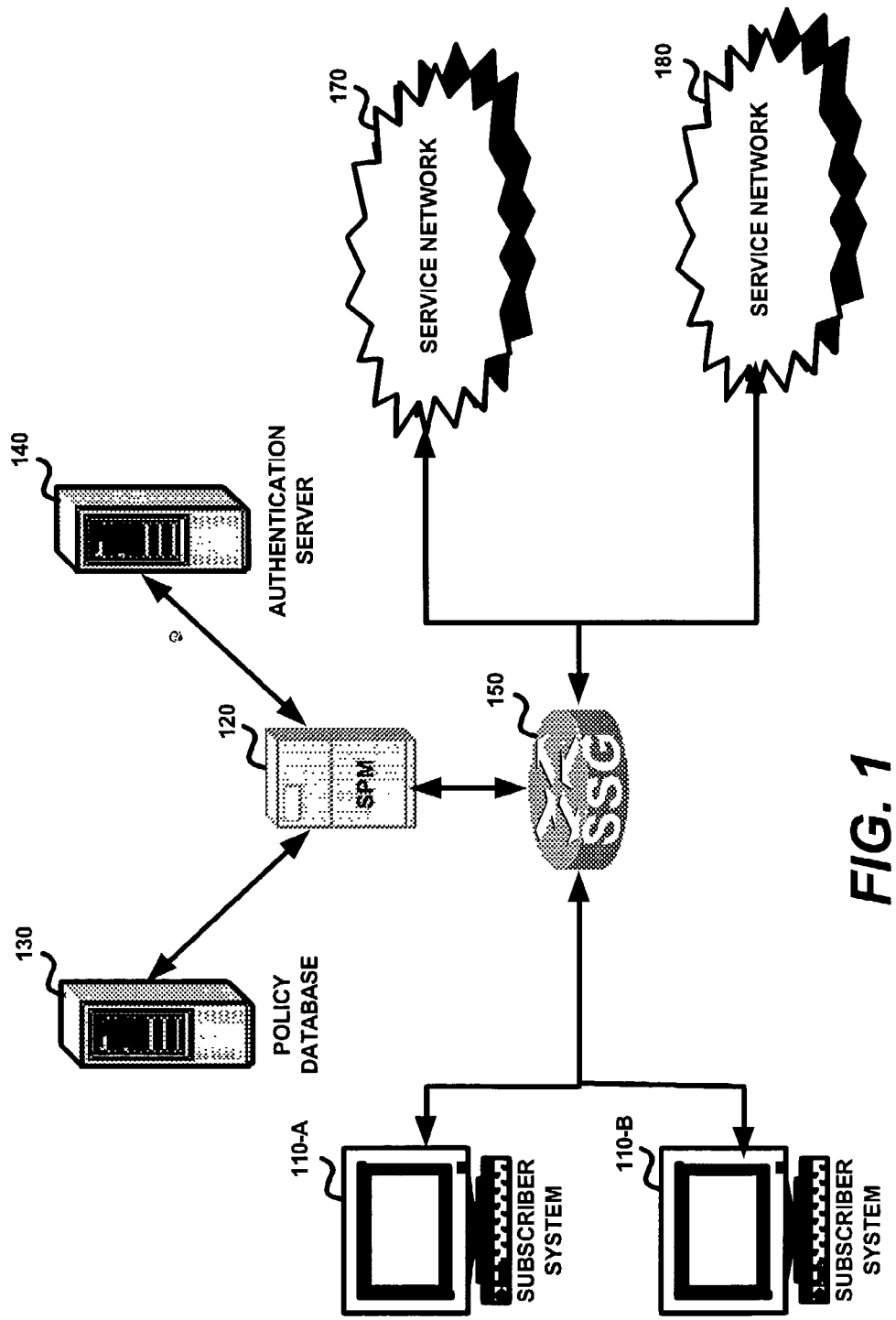
FIG. 1 is a block diagram illustrating an example environment in which the present invention can be implemented.

FIG. 1 is a block diagram illustrating an example environment in which the present invention can be implemented. The environment is shown containing subscriber systems 110A and 110B (individually or in combination referred by numeral 110 as will be clear from the context), subscriber policy manager (SPM) 120, policy database 130, authentication server 140, service selection gateway (SSG) 150, and service networks 170 and 180. Each system is described in further detail below.

Subscriber system 110 generally refers to a user system such as a personal computer (PC) using which a subscriber accesses services typically provided using servers in service networks 170 and 180. For purpose of illustration, it is assumed that there are four subscribers, father, mother, daughter and son. The manner in which the three subscribers may be treated as members of a community instance, and the manner in which several features can be provided according to various aspects of the present invention is described below.

Service networks 170 and 180 typically contain many servers (not shown) such as web servers and network devices (e.g., routers), which provide different services (e.g., Net Meeting or games between different subscribers). The specific services a subscriber is permitted (denied) to access may be determined by the various communities the subscriber is a member of, and the different rules implemented within the community as described below in further detail.

Authentication server 140 receives authentication information (e.g., user identifier and password) and authenticates the specific subscriber if the provided information is valid. Authentication server 140 may be implemented based on RFC-2865, entitled, "Remote Authentication Dial In User Service (RADIUS)", available from www.ietf.org, and is incorporated in its entirety herewith.

SSG 150, shown provided separate from service network 170, provides potentially different services to different subscribers consistent with the access policies specified for the individual subscribers according to various aspects of the present invention. Broadly, a subscriber ("first subscriber") may be part of potentially multiple communities (community instances), and other subscribers in the community may specify rules ("administer rules on") which affect the services provided to the first subscriber. The manner in which such community of subscribers may be supported using subscriber policy manager (SPM) 120 and policy database 130 is described with reference to several example below.

3. Method

Figure 2:
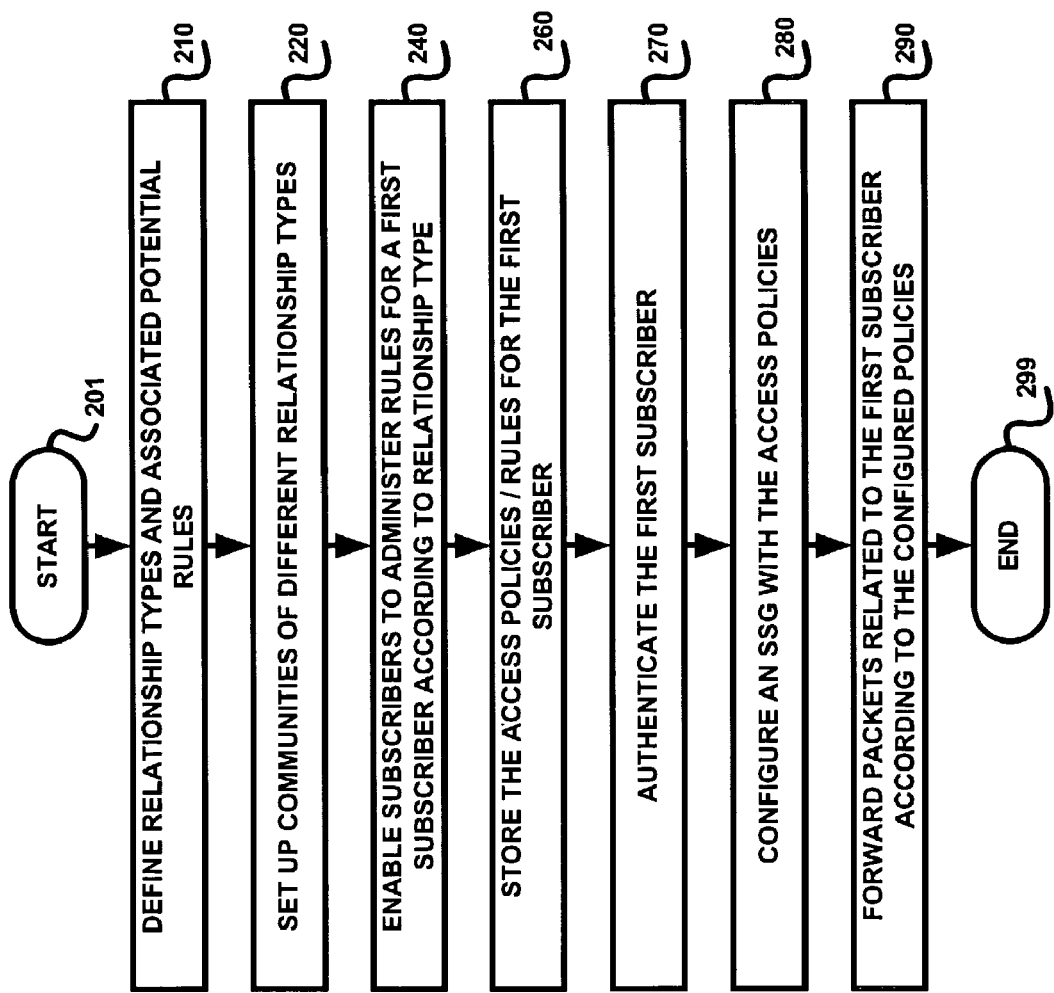
FIG. 2 is a flow chart illustrating a method in accordance with the present invention.

FIG. 2 is a flow-chart illustrating a method using which a community of subscribers may be supported according to an aspect of the present invention. The flow-chart is described with reference to the systems of FIG. 1 for illustration. However, the invention can be implemented in other environments as well. The method begins in step 201, in which control immediately passes to step 210.

In step 210, a service provider may define relationship types and associated potential rules. The data representing such relationship types may be stored in policy database 130. Examples of relationships include parent/child, sibling, employer/employee. A rule generally controls the access parameters (e.g., bandwidth, latency) or access points (specific services).

In step 220, the service provider may facilitate setting up of communities with different relationship types among the community members. For example, a community of four subscribers (father, mother, son, daughter) may be set up, with a parent/child relationship between mother and the two children, and a sibling relationship between the son and daughter. The data representing the subscribers and community types may also be stored in policy database 130.

In step 240, the permitted subscribers may be enabled to administer rules for a first subscriber according to relationship type. For example, SPM 120 may provide a suitable interface (e.g., web page) using which mother in the above example can send authentication information. SPM 120 passes the information to authentication server 140, which authenticates the mother. SPM 120 may then send another web page indicating the services mother is permitted to access and also indicating the specific rules mother can apply against the two children.

The mother may either access the services or administer the rules for the two children. Assume for illustration, a rule associated with a parent-child relationship may allow a mother to deny a child access of specific (types) web sites, and accordingly a mother may deny the son (first subscriber of step 240) access to disney.com. Similarly, another rule may allow a mother to change the bandwidth available for a child, and accordingly the mother may increase the permitted bandwidth for the son. Due to the sibling relationship, the bandwidth upgrade rule only is applied to the daughter as well.

Even though only one permitted subscriber (mother) is described as administering the rules for the first subscriber (i.e., son in this example), it should be understood that the first subscriber (i.e., the subscriber whose service policies are affected by administration by others) can be a part of many more communities and the rules for the subscriber may be set by other subscribers as well.

In step 260, the policies/rules ('/' implies either individually or together) for the first subscriber (and also the daughter in the above specific example) are stored: SPM 120 may store the policies/rules in policy database 130. In general, sufficient data needs to be stored so that SSG 150 can be later configured with the appropriate access policies for the first subscriber—son (and also the daughter).

In step 270, it is assumed that the first subscriber wishes to now access the permitted services. Accordingly, the first subscriber may be required to send authentication information. SPM 120 may receive the authentication information and interface with authentication server 140 to authenticate the first subscriber. Once authenticated, SPM 120 may retrieve the policies/rules information for the authenticated subscriber from policy database 130.

In step 280, SPM 120 configures SSG 150 with the policies/rules retrieved from policy database 130. The configuration may be performed according to any cooperating protocol implemented between SPM 120 and SSG 150. Even if the first subscriber is accessing services when step 240 is performed, SSG 150 may be implemented to dynamically accept the changed policies/rules and be configured according to the changed information.

Once the configuration is complete, SSG 150 forwards the packets related to the first subscriber according to the configured policies in step 290. The description is continued with reference to an example approach of specifying various rules, and then example embodiments of SPM 120 and SSG 150.

4. Example Approach for Specifying Rules

In an embodiment, an administrator for a particular community may first specify the relationships and policies for a corresponding community. The administrator may need to specify (as described below with examples) the global community wide rules (if any), a list of members within this community, possible relationships within this community, relations between the various members of the community, and relationship precedence or ordering list. This contains the precedence of the various relationships in the community.

When the administrator defines the possible relationships valid within the scope of this community, she/he needs to specify a relationship tag (containing a name/label identifying the relationship), properties for this relationship (e.g., limit on the number of entities/persons for each instance of the relationship, whether the relationship is reflexive, transitive, etc., in case of binary relationships), and the rules (e.g., what effects can one subscriber cause on another subscriber, in terms of service accessed, etc.).

For example, a family community may contain two relationships (A) parent-child; and (B) sibling relationships. An administrator may specify the following for the parent-child relationship:

(1) Relationship tag: parent-child;

(2) Number of entities in an instance of the relationship: 2;

(3) Relationship properties: Transitive; and (4) Relationship rules: if A is the parent of B, then A can administer policy on B.

When a transitive property is specified as above, a grandparent of the community could administer policies on grandchildren.

For sibling relationship, the following could be specified:

(1) Relationship tag: Sibling;

(2) Number of entities in an instance of the relationship: 2;

(3) Relationship properties: Symmetric and transitive; and (4) Relationship rules: If A and B are siblings, any policy administered on A is applied on B also.

Figure 6:
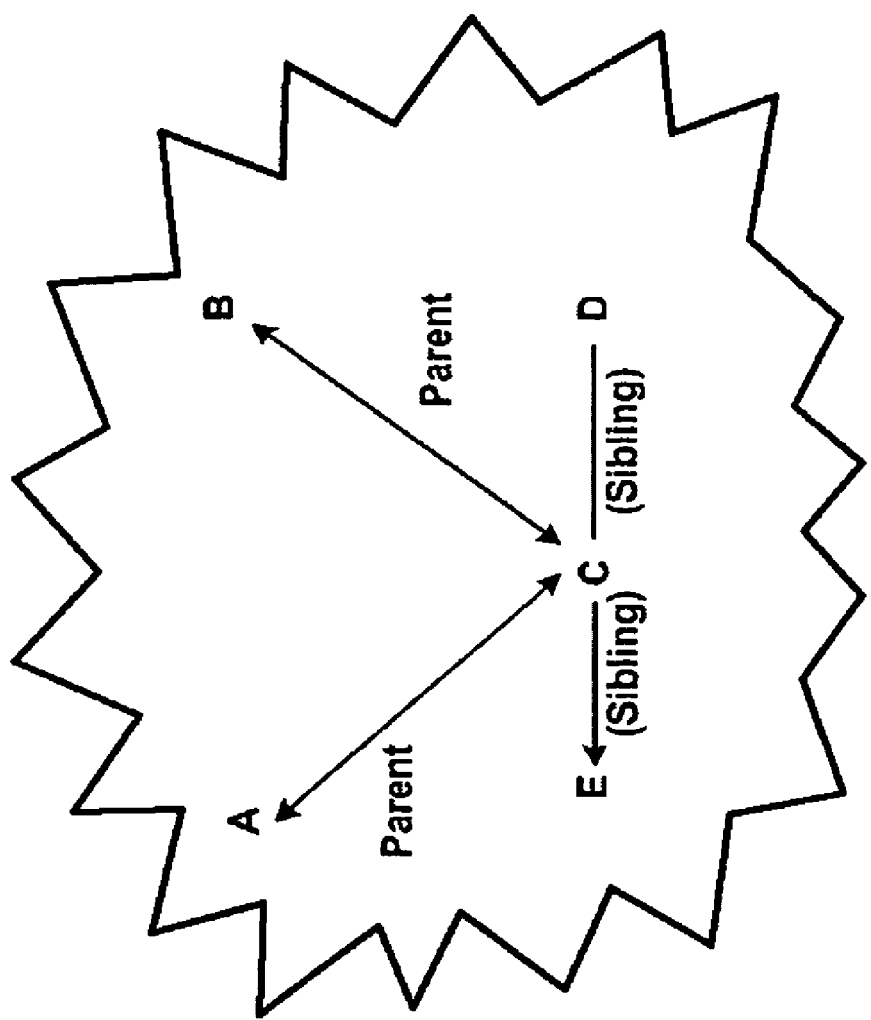
FIG. 6 depicts logically the relationships specified by an administrator in one embodiment.

Thus, assuming there are 5 members A, B, C, D and E in this family community, and an administrator may specify the following, as shown logically in FIG. 6:

(1) A is a parent of C;

(2) B is a parent of C;

(3) C and D are siblings; and (4) C and E are siblings.

Figure 7:
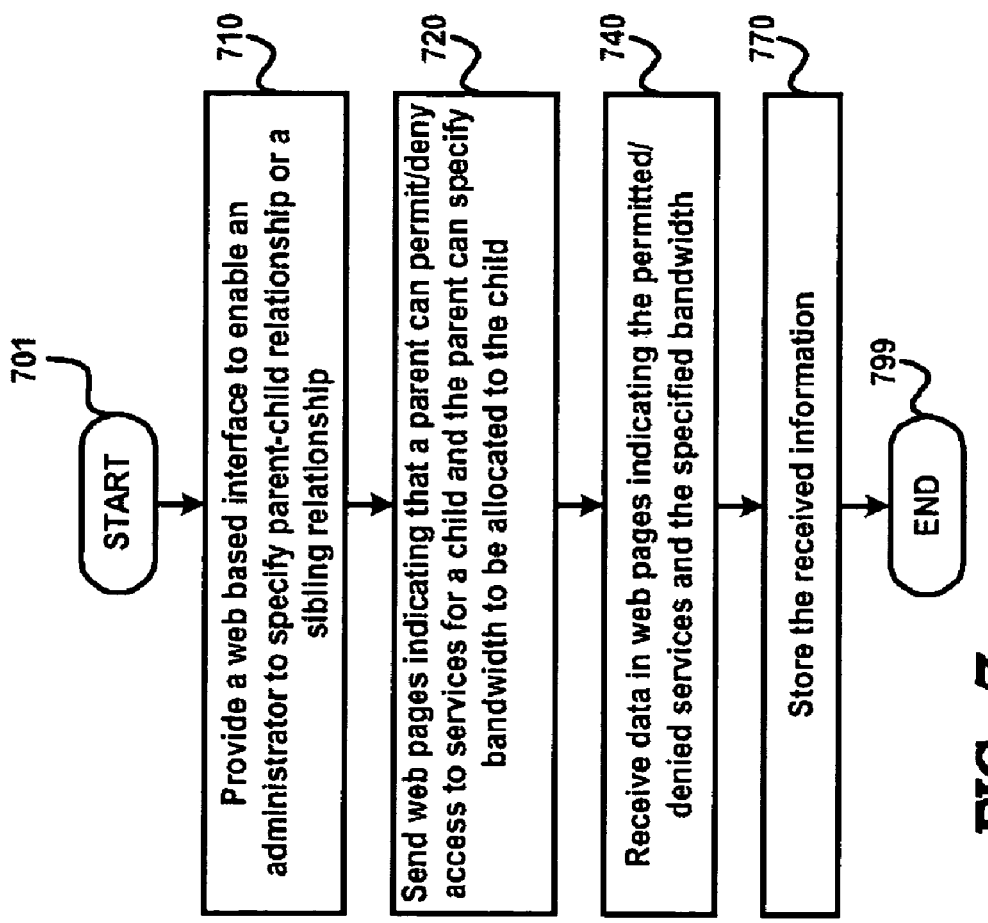
FIG. 7 is a flowchart illustrating the manner in which a parent can control the services available to a child in one embodiment.

In general, SPM 120 needs to be designed to provide a suitable interface to enable administrators to set up various community instances, and the corresponding rules. For example, with respect to the flowchart of FIG. 7, in step 710, a web-based interface may be provided such that the communities can be set up, possibly from many places. The web pages may be used to specify, for example, the community of FIG. 6.

In step 720, SPM 120 sends web pages indicating that a parent can permit/deny access to services for a child and the parent can specify bandwidth to be allocated to the child. In step 740, SPM 120 receives data indicating the permitted/denied services and the specified bandwidth. In step 770, SPM 120 stores the received information, for later use to configure SSG 150. The flowchart ends in step 799.

Thus, some of the rules may permit one subscriber to administer a rule on another subscriber, and the services provided to the another subscriber depend on the administered rule as well (in addition to the profile of the subscriber).

In addition, SSG 150, SPM 120 and policy database 130 need to be implemented according to consistent protocols to implement various features of the present invention. In an embodiment described below, SSG 150 implements forwarding policies on a per-subscriber basis. Accordingly, SPM and policy database 130 may also be implemented to process all the administrator inputs and sends data representing the policies to be enforced with reference to each subscriber. Example embodiments of policy database 130 and SPM 120 are described in further detail below.

5. Policy Database

In general, policy database 130 is used to store information related to the profiles of the specific subscribers ("subscriber profiles") as well as communities ("community profile"). The community profile contains the global community policies, definition of relationships and rules, the community head (administrator), list of members in the community and relations between the members (subscribers).

The subscriber profile contains list of access policies for a particular user for his service access through the service selection gateway. For example, a subscriber profile may contain the list of service networks a subscriber is allowed to access, amount of bandwidth allocated, personal firewall filter, etc. In addition, the specific person (rule) causing the enforcement of the policy may also be specified associated with each access policy. In addition, the subscriber profile may contain the list of communities to which the subscriber belongs.

Policy database 130 can be implemented using any of several database technologies available from companies such as Oracle (www.oracle.com) and IBM (www.ibm.com). The manner in which SPM 120 uses policy database 130 and causes subscribers to access services according to the corresponding services policies, is described below in further detail.

6. Subscriber Policy Manager

In an embodiment, SPM 120 contains inbound interface 310, message classification block 320, profiles set up block 330, rules administration block 340, access policy block 350, database interface block 370, policy compiler block 380, and outbound interface 390. Each component is described below in further detail.

Inbound interface 310 provides the electrical, physical and protocol interfaces to enable SPM 120 to receive various messages (in the form of cells/packets). The received messages are forwarded to message classification block 320. Outbound interface 390 also provides the electrical, physical and protocol interfaces to enable SPM 120 to send various data cells/packets. Both inbound interface 310 and outbound interface 390 may be implemented in a known way.

Message classification block 320 examines each received message and forwards the messages to appropriate subsequent block. Messages related to setting up of communities are forwarded to profiles set up block 330. Messages related to administration of access policies/rules are forwarded to rules administration block 340. Messages from SSG 150 related to transfer of access policies are forwarded to access policy block 350.

Profiles set up block 330 enables an administrator to define various communities (or community instances) by providing a suitable interface. The administrator is first authenticated by using authentication server 140. The authentication information may indicate whether the administrator can set up a community or modify the corresponding community profile.

One of several possible interfaces may be used to enable an administrator to set up a community once it is determined that the administrator is authorized to set up the community. For example, a web page may be provided to specify the name of the community and members in the community. Similarly, another web page may provide an administrator the option to select different relationships between the specified subscribers in the community, and the rules associated with the selected relationships.

The information thus provided by an administrator forms a community profile, and data representing the community profile may be stored in policy database 130 using database interface block 370. Some of the rules indicate the specific access policies of other subscribers that may be controlled. The details (e.g., specific parameters to be requested from the users for each rule) of the rules may be retrieved from rules table 335, and new definitions (of new types of rules) may be stored in rules table 335 for later use. Alternatively, rules table 335 may also be implemented within policy database 130.

Profiles set up block 330 may further enable an administrator to edit community profiles. Again, profiles set up block 330 may first determine whether the administrator is authorized to administer the community sought to be administered, and then permits the authorized administrators to administer the corresponding communities. The interface may be provided in the form of web pages, which lists the rules and relationships presently stored in policy database 170, and conveniently enable the administrator to specify various options such as deletion, addition and edits of various rules and relationships.

Thus, profiles set up block 330 may need to be designed to interface with policy database 130 using database interface block 370 to store and retrieve various pieces of information. Database interface block 370 provides various modules the ability to retrieve and store various pieces of data of interest. In general, database interface block 370 needs to be implemented consistent with the interfaces provided by the technology underlying policy database 130, and may be implemented in a known way.

Rules administration block 340 enables a subscriber to administer rules on other subscribers according to the community profile(s) present in policy database 130. When a subscriber is authenticated, the subscriber may be provided the option to indicate whether the subscriber wishes to administer the rules on any other subscribers. If the subscriber indicates interest to administer rules, rules administration block 340 may examine the subscriber profile of the subscriber to determine the various communities the subscriber is a member of. The profiles of all the communities may then be examined to determine the specific subscribers on which the subject (authenticated) subscriber can administer rules, and any pre-specified rules that may be administered.

Rules administration block 340 then provides a suitable interface using which the subject subscriber may select (or remove selection) the specific rules to cause the selected rules to be administered on the specific subscribers. For example, a list of rules may be provided associated with each subscriber (the subject subscriber is permitted to administer rules on), and the subject subscriber may merely need to check (or remove check) the specific rules to be administered associated with each subscriber. The interaction may be provided using web pages.

Rules administration block 340 may interface with policy compiler 380 to determine whether specified rules can be administered consistent with the various community and subscriber profiles. Once it is determined that a rule can be administered, data representing the rule may be stored in policy database 130 using database interface block 370. The specific subscriber causing the selection of the rule may also be stored.

Policy compiler block 380 receives a request to specify the access policies (or services to be provided) for a specific subscriber (from access policy block 350), and sends data representing the access policies. The access policies are determined by examining the rules present in policy database 130 and the corresponding subscriber profile.

Policy compiler block 380 may be designed to examine the various types of relationships administered with other subscribers as well, in determining the access policies applicable to a present subscriber. For example, if a present subscriber is a subscriber of a sibling subscriber, the rules administered on the sibling subscriber may also be examined to determine whether a rule administered on the sibling subscriber is applicable to the present subscriber as well. Thus, policy compiler block 380 generates data representing the access policies to be used for a subscriber.

In addition, policy compiler 380 may determine whether a specific rule sought to be administered, is in fact permitted to be administered. Such a determination may be made in response to receiving a request for determination from rules administration block 540. Policy compiler 380 may interface with database interface block 370 to retrieve any profile information necessary for the determination.

Access policy block 350 receives a request (from SSG 150) to provide data representing access policies for an authenticated subscriber, and sends the requested data in response. Access policy block 350 interfaces with policy compiler block 380 to determine the access policies for the authenticated subscriber, and then sends the access policies to SSG 150 according to a pre-specified protocol to cause SSG 150 to be configured to provide services to the subscriber according to the access policies.

Figure 3:
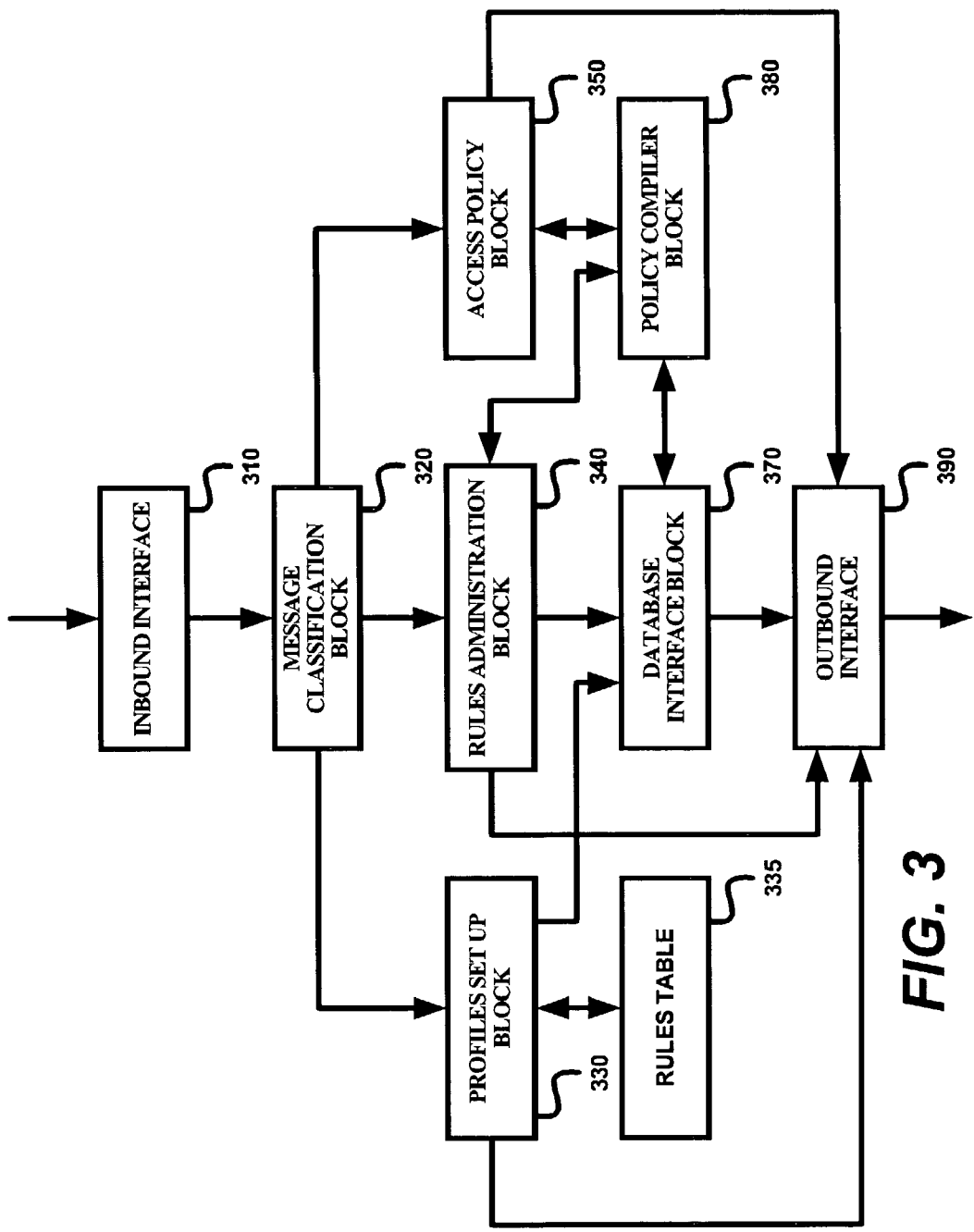
FIG. 3 is a block diagram illustrating the details of a subscriber policy manager in an embodiment of the present invention.

In general, SSG 150 and SPM 120 need to be implemented with consistent protocols to provide various features of the present invention. While the embodiment(s) are described with SSG 150 and SPM 120 being implemented as separate embodiments, an alternative embodiment may be implemented to integrate more features of SPM 120 into SSG 150. An example embodiment of service selection gateway consistent with the operation of SPM 120 of FIG. 3, is described below with reference to FIG. 4.

7. Service Selection Gateway

Figure 4:
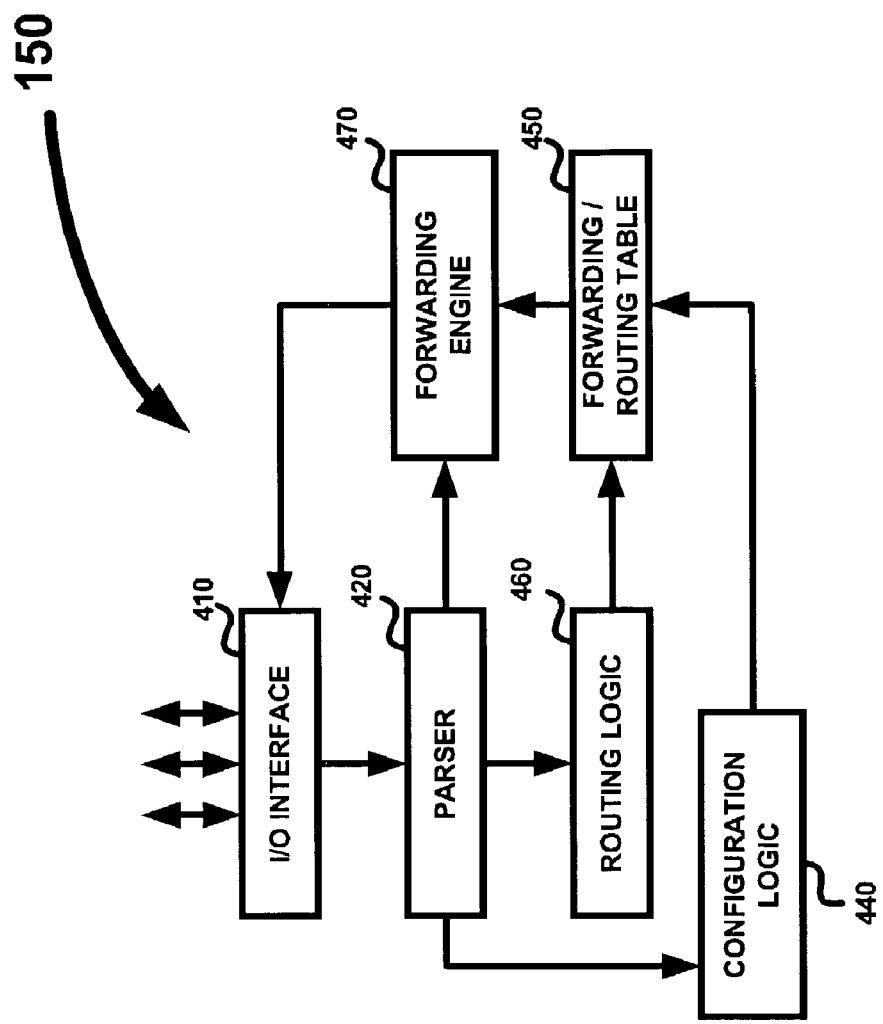
FIG. 4 is a block diagram illustrating the internals of an embodiment of a service selection gateway (SSG) provided in accordance with the present invention.

FIG. 4 is a block diagram illustrating the details of an embodiment of service selection gateway (SSG) 150 in accordance with an aspect of the present invention. SSG 150 is shown containing I/O interface 410, parser 420, configuration logic 440, forwarding/routing table 450, routing logic 460, forwarding engine 470, and set up logic 480. Each of the blocks is described in further detail below.

I/O interface 410 provides the physical, electrical and other protocol interfaces necessary for IP packets (potentially using different transports such as ATM) to be sent to and received from the other systems, i.e., subscriber system 110, service networks 170 and 180, authentication server 140, and SPM 120. The received packets are forwarded to parser 420 for further processing. I/O interface 410 may contain several physical ports which can be used to send packets on different paths. I/O interface 410 may be implemented in a known way.

Parser 420 examines each received packet to determine whether to forward the contained data (or the entire packet) to configuration logic 440, routing logic 460 or forwarding engine 470. Data related to service/rule information for each specific subscriber is forwarded to configuration logic 440. Routing related data may be sent to routing logic 460. IP packets requiring forwarding are sent to forwarding engine 470.

Forwarding/routing table 450 stores the routing and service information necessary to process the packets which need to be forwarded to a next hop. In general, routing information indicates the path in which the packet is to be forwarded, and the service information indicates whether/when to forward (or block) a packet according to the services the corresponding subscriber is permitted to access. In addition, the service information may store various parameters related to QOS, etc., as well.

The service information and routing information may be stored in the form of a single table or separate multiple tables as felt necessary by a designer consistent with the implementation of other components. The forwarding/routing table may store other policy information such as the bandwidth to be provided to each subscriber.

Routing logic 460 processes the routing information received from parser 410. The routing information is stored in forwarding/routing table 450. Routing logic 460 may be implemented in a known way.

Configuration logic 440 receives packets representing the services to be provided to each subscriber. Configuration logic 440 may configure forwarding/routing table 450 to provide the services based on the received data. As described above, the services to be provided depend on various rules administered on each subscriber. In addition, configuration logic 440 may be provided the ability to configure the forwarding table entries related to a subscriber (dynamically) even if the subscriber is presently accessing services. In one embodiment, configuration block 440 receives data representing the administered rules and determines the services to be provided.

In an alternative embodiment, SPM 120 determines the services to be provided depending on the rules administered and sends packets representing the services directly. Configuration logic 440 stores the corresponding service information in the service tables. The information may be stored (and used) in the form of objects, for example, as described in co-pending U.S. patent application Ser. No. 10/086,346; Filed: Mar. 4, 2002, Entitled, "Service Selection Gateway (SSG) Allowing Access to Services Operating Using Changing Set of Access Addresses", which is incorporated in its entirety herewith. The storage approach in an embodiment is described briefly below.

Forwarding engine 470 determines the manner in which each packet received from parser 420 is to be processed. The routing information may be used to determine the specific port of I/O interface 410 on which to forward the packet.

The service information may be used to determine whether/when to forward the packet. Forwarding engine 470 may need to determine the specific subscriber and service to which a received packet relates to, and process the packet according to the service information related to the subscriber/service. Forwarding/routing table 450 may be examined for the routing and service information.

Thus, SSG 150 can be used to enable some members of a community to administer rules on other members of the community. It should be understood that the different components of an SSG can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing SSG 150 with a desired mix of hardware, software and/or firmware. An embodiment implemented substantially in software is described below.

8. Software Implementation

Figure 5:
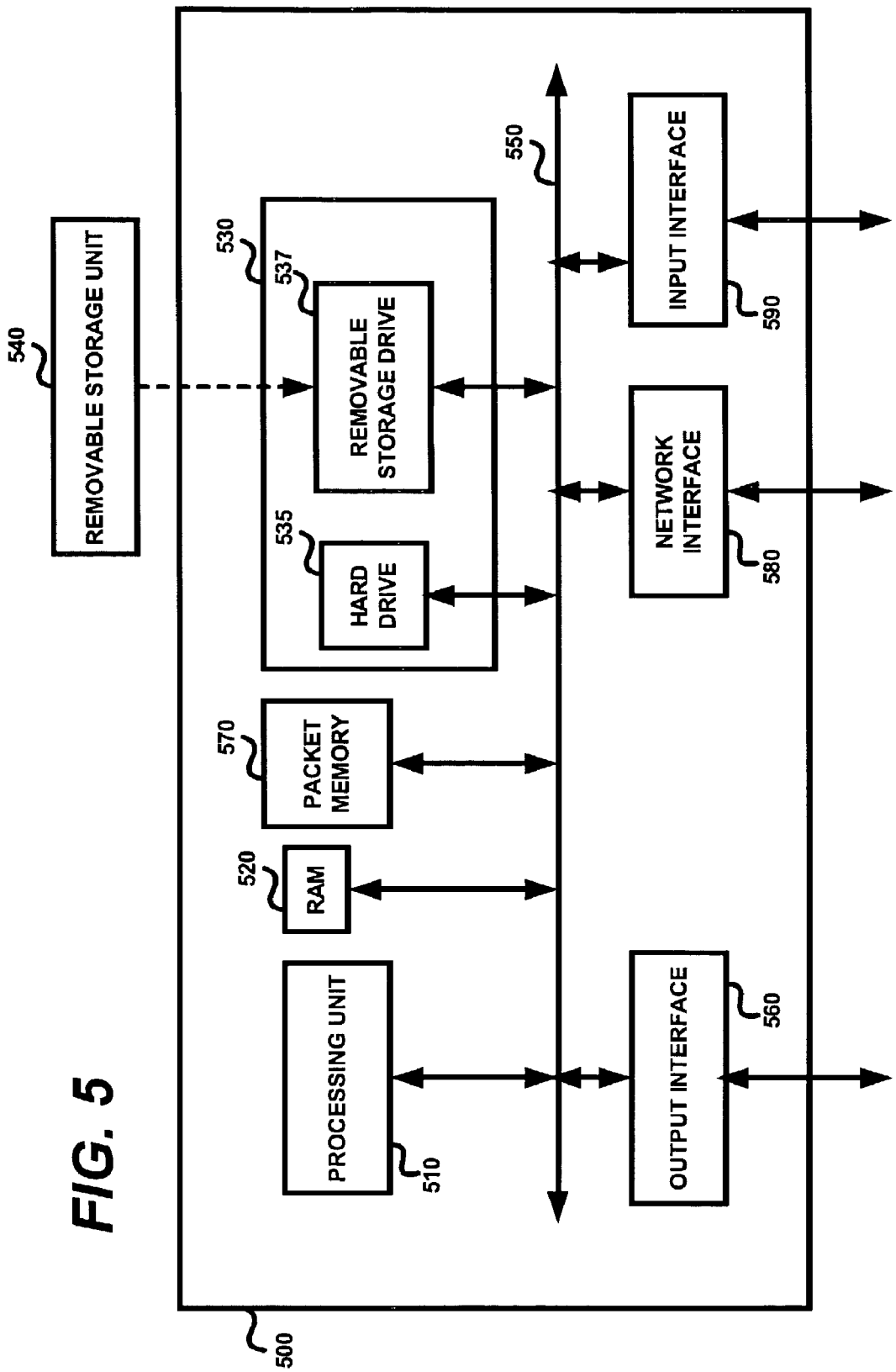
FIG. 5 is a block diagram illustrating the details of an embodiment of a system substantially in the form of software according to an aspect of the present invention.

FIG. 5 is a block diagram illustrating the details of system 500 in one embodiment. System 500 can correspond to either SSG 150 or SPM 120 as described below. System 500 is shown containing processing unit 510, random access memory (RAM) 520, storage 530, output interface 560, packet memory 570, network interface 580 and input interface 590. Each component is described in further detail below.

Output interface 560 provides output signals (e.g., display signals to a display unit, not shown) which can form the basis for a suitable subscriber interface for an administrator (configuring system 500) to interact with system 500. Network interface 580 may enable system 500 to send and receive data on communication networks using internet protocol (IP). In the case of SPM 120, network interface 580 can be used to enable an administrator to set up a community, and then a first subscriber to administer rules on a second subscriber in the community.

Input interface 590 (e.g., interface with a key-board and/or mouse, not shown) enables a user/administrator to provide any necessary inputs to system 500. For example, using input interface 590 and output interface 560, a service provider may specify the various rules permitted for various relationship types (within SPM 120). Network interface 580, output interface 560 and input interface 590 can be implemented in a known way.

RAM 520, storage 530, and packet memory 570 may together be referred to as a memory. RAM 520 receives instructions and data on path 550 from storage 530, and provides the instructions to processing unit 510 for execution. Packet memory 570 stores (queues) packets/cells waiting to be forwarded (or otherwise processed) on different ports.

Secondary memory 530 may contain units such as hard drive 535 and removable storage drive 537. Secondary storage 530 may store the software instructions and data, which enable system 500 to provide several features in accordance with the present invention. In an embodiment, secondary memory 530 provides the necessary storage to save various information (e.g., the administered rules and/or service information), which forms the basis for the configuration of SSG 150.

Some or all of the data and instructions may be provided on removable storage unit 540 (or from a network using protocols such as Internet Protocol), and the data and instructions may be read and provided by removable storage drive 537 to processing unit 510. Floppy drive, magnetic tape drive, CD-ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520.

In general, processing unit 510 reads sequences of instructions from various types of memory medium (including RAM 520, storage 530 and removable storage unit 540), and executes the instructions to provide various features of the present invention. Thus, in the case of SPM 120, a subscriber may be provided a suitable interface to administer rules on another member of the same community. In the case of SSG 150, the packets related to the subscribers may be forwarded according to the services determined by subscriber's own profile and the rules administered by other members of the same community.

While the above embodiment(s) are described above substantially with reference to hierarchical (e.g., parent/child) and equal (e.g., siblings) relationships, it should be understood that alternative embodiments can be implemented with any other types of relationships and rules (which can be any type according to the well known principles in graph theory). Such embodiments are contemplated to be within various aspects of the present invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method comprising:
storing data representing whether a first subscriber and a second subscriber are in a same community and whether said first subscriber is permitted to administer rules on said second subscriber;
enabling said first subscriber to administer a rule, wherein said rule indicates a service which said second subscriber is either permitted to access or not permitted to access, wherein said service is provided from one or more servers contained in a service network accessible at a layer-3 address, wherein an administrator defines a list of subscribers within the community, relationships between the subscribers in the community, a precedence associated with the relationships, and whether a selected one of the relationships are transitive and symmetrical, wherein if the selected relationship is transitive then the first subscriber and a third subscriber are both authorized to administer a first policy decision for the second subscriber, wherein the first policy decision involves access to a network service for the second subscriber and a firewall parameter associated with the second subscriber, and wherein if the selected relationship is symmetrical then a second policy decision made for the second subscriber by the first subscriber is automatically applied to a fourth subscriber without requiring additional input from the first subscriber, wherein the second policy decision involves access to the network service and the firewall parameter; and
configuring a service selection gateway (SSG) according to said rule, wherein said SSG operates as a layer-3 switching device connecting a subscriber system and said one or more servers, wherein said subscriber system is used by said second subscriber to access said service.

2. The method of claim 1, further comprising:
storing data representing a relationship between said first subscriber and said second subscriber; and
storing data representing a plurality of rules which can be administered associated with each of a plurality of relationships, wherein said relationship is comprised in said plurality of relationships and said rule is comprised in said plurality of rules associated with said relationship.

3. The method of claim 2, wherein said first subscriber comprises a parent and said second subscriber comprises a child, wherein said relationship comprises a parent-to-child relationship.

4. The method of claim 1, wherein said enabling comprises:
receiving authentication information from said first subscriber;
sending a web page representing said plurality of rules associated with said relations; and
receiving in said web page said rule administered by said first subscriber.

5. The method of claim 4, wherein said enabling is performed from a subscriber policy manager (SPM).

6. The method of claim 5, further comprising:
generating in said SPM a service information according to said rule; and
sending said service information to said SSG to cause said SSG to be configured.

7. The method of claim 6, wherein said SPM is integrated with said SSG into a single system.

8. The method of claim 5, wherein said SPM interfaces with an authentication server to authenticate said first subscriber according to said authentication information, said SPM storing in a database data representing said rule administered in said enabling.

9. The method of claim 5, wherein said method further comprises:
further enabling said first subscriber to administer an another rule on said second subscriber when said second subscriber is accessing a service; and
further configuring said SSG according to said another rule.

10. The method of claim 9, wherein said another rule comprises said second rule such that said bandwidth allocated to said second subscriber is changed while said subscriber is accessing said service.

11. The method of claim 1, wherein said layer-3 switching device is an Internet Protocol (IP) router.

12. A non-transitory computer readable medium having one or more sequences of instructions for providing services to subscribers, wherein execution of said one or more sequences of instructions by one or more processors causes said one or more processors to perform the actions of:
storing data representing whether a first subscriber and a second subscriber are in a same community and whether said first subscriber is permitted to administer rules on said second subscriber;
enabling said first subscriber to administer a rule, wherein said rule indicates a service which said second subscriber is either permitted to access or not permitted to access, wherein said service is provided from one or more servers contained in a service network accessible at a layer-3 address, wherein an administrator defines a list of subscribers within the community, relationships between the subscribers in the community, a precedence associated with the relationships, and whether a selected one of the relationships are transitive and symmetrical, wherein if the selected relationship is transitive then the first subscriber and a third subscriber are both authorized to administer a first policy decision for the second subscriber, wherein the first policy decision involves access to a network service for the second subscriber and a firewall parameter associated with the second subscriber, and wherein if the selected relationship is symmetrical then a second policy decision made for the second subscriber by the first subscriber is automatically applied to a fourth subscriber without requiring additional input from the first subscriber, wherein the second policy decision involves access to the network service and the firewall parameter;
configuring a service selection gateway (SSG) according to said rule.

13. The non-transitory computer readable medium of claim 12, further comprising:
storing data representing a relationship between said first subscriber and said second subscriber; and
storing data representing a plurality of rules which can be administered associated with each of a plurality of relationships, wherein said relationship is comprised in said plurality of relationships and said rule is comprised in said plurality of rules associated with said relationship.

14. The non-transitory computer readable medium of claim 13, wherein said first subscriber comprises a parent and said second subscriber comprises a child, wherein said relationship comprises a parent-to-child relationship.

15. The non-transitory computer readable medium of claim 12, wherein said enabling comprises:
- receiving authentication information from said first subscriber;
- sending a web page representing said plurality of rules associated with said relations; and
- receiving in said web page said rule administered by said first subscriber.

16. The non-transitory computer readable medium of claim 15, wherein said enabling is performed from a subscriber policy manager (SPM).

17. The non-transitory computer readable medium of claim 16, further comprising: generating in said SPM a service information according to said rule; and sending said service information to said SSG to cause said SSG to be configured.

18. The non-transitory computer readable medium of claim 17, wherein said SPM is integrated with said SSG into a single system.

19. The non-transitory computer readable medium of claim 16, wherein said SPM interfaces with an authentication server to authenticate said first subscriber according to said authentication information, said SPM storing in a database data representing said rule administered in said enabling.

20. The non-transitory computer readable medium of claim 16, further comprising:
- further enabling said first subscriber to administer an another rule on said second subscriber when said second subscriber is accessing a service; and
- further configuring said SSG according to said another rule.

21. The non-transitory computer readable medium of claim 12, wherein said layer-3 switching device comprises an Internet Protocol (IP) router and wherein said IP router determines whether or not to forward packets from said second subscriber to said one or more servers based on said rule.

* * * * *